United States Patent
Micheel et al.

(10) Patent No.: US 8,403,003 B2
(45) Date of Patent: Mar. 26, 2013

(54) FLUID PRESSURE CONTROL DEVICE HAVING A THROTTLING ELEMENT SEAL

(75) Inventors: Raymond W. Micheel, Gilman, IA (US); David J. Westwater, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 533 days.

(21) Appl. No.: 12/266,475

(22) Filed: Nov. 6, 2008

(65) Prior Publication Data

US 2009/0057595 A1    Mar. 5, 2009

Related U.S. Application Data

(62) Division of application No. 11/082,265, filed on Mar. 17, 2005, now Pat. No. 7,448,409.

(51) Int. Cl.
*F16K 1/52* (2006.01)
(52) U.S. Cl. .............................. 137/625.33; 137/625.39
(58) Field of Classification Search ............... 137/625.3, 137/625.33, 625.34, 625.37–625.39; 251/210
See application file for complete search history.

(56) References Cited

U.S. PATENT DOCUMENTS

| | | | |
|---|---|---|---|
| 2,772,068 A | 11/1956 | Grove et al. | |
| 3,219,059 A | 11/1965 | Williams et al. | |
| 3,648,718 A | 3/1972 | Curran | |
| 3,704,726 A | 12/1972 | Lewis | |
| 3,722,860 A | 3/1973 | Curran | |
| 3,821,968 A * | 7/1974 | Barb | 137/625.3 |
| 4,132,386 A * | 1/1979 | Lee | 251/171 |
| 4,375,821 A * | 3/1983 | Nanao | 137/625.3 |
| 4,397,331 A | 8/1983 | Medlar | |
| 4,471,810 A * | 9/1984 | Muchow et al. | 137/625.37 |
| 4,531,545 A * | 7/1985 | Muchow | 137/625.39 |
| 4,569,370 A * | 2/1986 | Witt | 137/625.3 |
| 4,573,492 A * | 3/1986 | Tadokoro | 137/625.3 |
| 4,619,377 A | 10/1986 | Roos | |
| 4,669,702 A | 6/1987 | Tripp | |
| 5,018,703 A | 5/1991 | Goode | |

(Continued)

FOREIGN PATENT DOCUMENTS

| | | |
|---|---|---|
| EP | 0 167 252 | 1/1986 |
| EP | 0 573 399 | 12/1993 |

(Continued)

OTHER PUBLICATIONS

Orlov, "Construction Basics: A Reference and Teacher Guide," *Mashinostroyeniye*, pp. 518 (1998).

(Continued)

*Primary Examiner* — John Fox
(74) *Attorney, Agent, or Firm* — Marshall, Gerstein & Borun LLP

(57) ABSTRACT

A fluid flow control device includes a body defining an inlet, an outlet, and a fluid flow path extending from the inlet to the outlet. A valve seat ring is coupled to the body and defines an orifice through which the fluid flow path passes. A cage is also coupled to the body and defines an interior bore, wherein the cage includes at least one passage through which the fluid flow path passes. A throttling element is sized for insertion into the cage interior bore and movable along an axis between open and closed positions. The throttling element defines a sealing surface oriented substantially parallel to the axis. A seal is positioned to engage the sealing surface when the throttling element is substantially in the closed position, thereby to restrict fluid flow through the valve seat ring orifice.

4 Claims, 4 Drawing Sheets

U.S. PATENT DOCUMENTS

| | | | |
|---|---|---|---|
| 5,020,571 A | | 6/1991 | Tartaglia et al. |
| 5,113,908 A | | 5/1992 | Steinke |
| 5,236,014 A | | 8/1993 | Buls et al. |
| 5,351,717 A | | 10/1994 | Saito |
| 5,381,818 A | | 1/1995 | Nendzig et al. |
| 5,964,248 A | * | 10/1999 | Enarson et al. ........... 137/625.39 |
| 6,394,135 B2 | * | 5/2002 | Erickson et al. ......... 137/625.38 |
| 6,637,452 B1 | | 10/2003 | Alman |
| 6,772,993 B1 | * | 8/2004 | Miller et al. ................... 251/363 |
| 6,805,162 B2 | * | 10/2004 | Stratton ................... 137/625.37 |
| 6,807,985 B2 | * | 10/2004 | Stares et al. ............. 137/625.33 |
| 7,448,409 B2 | | 11/2008 | Micheel et al. |

FOREIGN PATENT DOCUMENTS

| | | |
|---|---|---|
| GB | 1 569 261 | 6/1980 |
| JP | 61-013067 | 1/1986 |
| JP | 61-137175 | 8/1986 |
| JP | 02-252687 | 10/1990 |
| JP | 06-081967 | 3/1994 |
| JP | 06-249347 | 9/1994 |
| JP | 2002-106730 | 4/2002 |
| RU | 2 109 191 C1 | 4/1998 |
| RU | 2 184 897 C2 | 7/2002 |
| WO | WO-2006/101594 A1 | 9/2006 |

OTHER PUBLICATIONS

Canadian Office Action for Application No. 2,601,074, dated Jun. 9, 2009.

First Chinese Office Action for Application No. 200680008287.6, dated Aug. 21, 2009.

Second Chinese Office Action for Application No. 200680008287.6, dated Jun. 10, 2010.

European Examination Report for Application No. 06719863.0, dated Feb. 28, 2008.

International Preliminary Report on Patentability for Application No. PCT/US2006/003201, dated Sep. 18, 2007.

Russian Office Action for Application No. 2007134150, dated Sep. 17, 2009.

International Search Report received in International (PCT) Application PCT/US2006/003201 by the European Patent Office, dated Jun. 1, 2006.

Written Opinion for Application PCT/US2006/003201 by the European Patent Office, dated Jun. 1, 2006.

Office Action for Japanese Patent Application No. 2008-501876, dated Feb. 8, 2011.

Office Action for Japanese Patent Application No. 2008-501876, dated Aug. 30, 2011.

* cited by examiner

FLUID PRESSURE CONTROL DEVICE HAVING A THROTTLING ELEMENT SEAL

FIELD OF THE DISCLOSURE

The present disclosure generally relates to fluid flow control devices, and more particularly, to a seal for engaging a throttling element used in such fluid flow control devices.

BACKGROUND OF THE DISCLOSURE

Fluid flow control devices, such as a control valves and regulators, are commonly used to control characteristics of a fluid flowing through a pipe. A typical device includes a valve body defining an inlet, an outlet, and a fluid flow path extending between the inlet and the outlet. A valve seat ring is coupled to the valve body and defines an orifice through which the flow path travels. A throttling element, such as a plug, is moveable relative to the valve seat ring thereby to control fluid flow through the orifice.

Certain fluid flow control devices employ a cage-style trim in which a cage is provided for guiding movement of the throttling element. The cage defines an interior bore sized to receive the throttling element and includes at least one passage through which the fluid flow path passes. The throttling element is moveable to a closed position in which the throttling element closes off at least one passage through the cage. Because of machining tolerances, however, a thin annular gap is present between an exterior surface of the throttling element and the interior bore surface of the cage. This gap may allow fluid to flow through, thereby creating a potential leak source when the device is intended to be in the closed position. To fully close the device, a bottom edge of the throttling element is typically driven by a closing force supplied by an actuator into the valve seat ring, thereby to provide a primary seal in the fluid flow control device.

Conventional primary seals formed by throttling elements pressed against valve seat rings are prone to leaks. A primary leak path is formed in the clearance between throttling element and cage which extends from the cage passage to the valve seat ring orifice. Fluid pressure upstream of the primary seal creates a pressure differential across the seal. As a result, any imperfections in the mating surfaces or other disruptions of the seal will allow fluid to leak when the throttling element is in the closed position. Such leaks may erode the valve seat thereby accelerating the rate of leakage, which in turn exacerbates seat erosion.

The leakage and erosion problems are even more pronounced when the fluid flow control device is used in an erosive environment. In certain applications, such as valves used to control the flow of water into a boiler in a power plant, tend to erode the primary seal more quickly. Power plant applications have historically been fairly non-erosive when the plant was started only a few times each year and typically operated 24 hours a day. More recently, power plants are started on a daily basis and operate only during peak-load daytime hours. As a result, scale that has built up on the inside of water pipes tends to loosen and break off as the pipes expand and contract during heating up and cooling down periods each day. These loosened scale particles have a high hardness and can become entrained in the fluid flow as it passes through the pipe and any fluid flow control devices disposed therein. The velocity of water passing through the pipes used to supply the boilers is relatively high, and therefore scale particles entrained in the water impinge on the primary sealing surfaces and quickly erode the valve seat. Valve seat erosion prevents the valve from shutting off the water flow, reduces power plant efficiency, and causes further damage to the fluid flow control device.

One traditional approach to solving the erosion problem has been to use harder materials for both the seating and the throttling element. While this approach works for certain applications, many power plants have recently started using chemicals having corrosive properties to treat the boiler feed water. Frequent cycling operation also makes it more difficult to control water chemistry. In general, harder materials tend to be more susceptible to corrosion, and therefore this approach may be used only in limited applications.

Another known approach has been to use a soft meal seat on the seat ring with a hard metal seat on the throttling element. The throttling element is then pressed against the soft seat ring with sufficient force to make a new seat each time the throttling element closes. Again, this approach works for limited applications and suffers from several draw backs. First, anything trapped between the seating surfaces as the throttling element closes will prevent full shut off, resulting in high velocity fluid flow across the seat which quickly erodes the soft seat material. If the throttling element is somehow able to shut completely, the debris will create an indentation in the soft seat material. When the valve is subsequently opened and the debris is flushed away, the indentation will create a leak path in the seat which again results in high velocity fluid flow and erosion of the seat material when the throttling element is subsequently closed.

DETAILED DESCRIPTION

A seal for restricting fluid flow through a primary leak path is disclosed. The seal is disposed in the primary leak path and engages the throttling element in the closed position to reduce or prevent fluid flow through the leak path. The seal may replace or be provided in addition to conventional seals formed by the engagement of the throttling element with the valve seat ring, which are dependent on the actuator force applied to the throttling element. In one embodiment, the seal engages an inner perimeter of the throttling element thereby to locate the seal away from the normal fluid flow path when the throttling element is in the open position.

Figure 1:
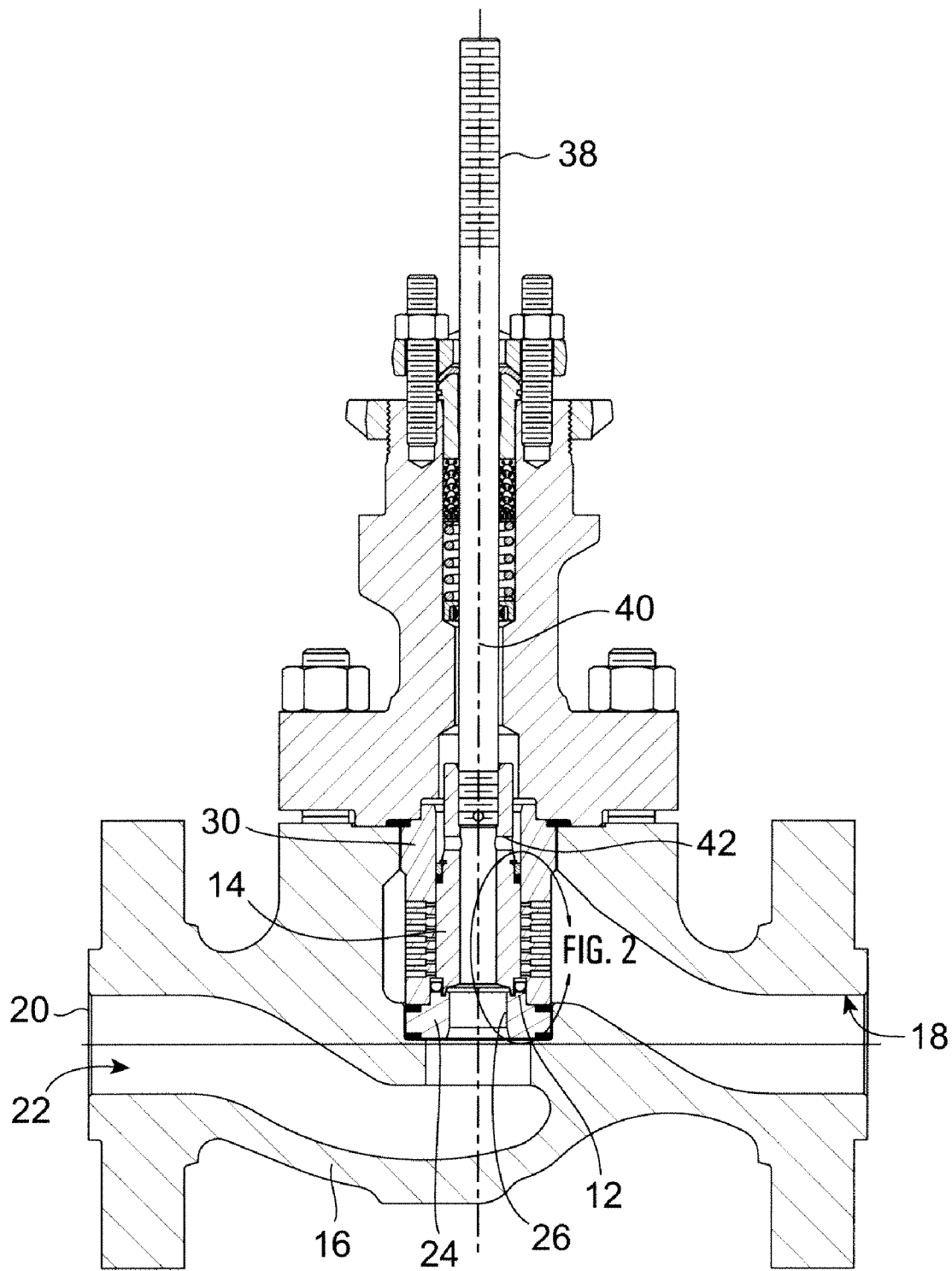
FIG. 1 is a side elevation view, in cross-section, of a fluid flow control device having a seal for preventing fluid flow through a primary leak path.
Figure 2:
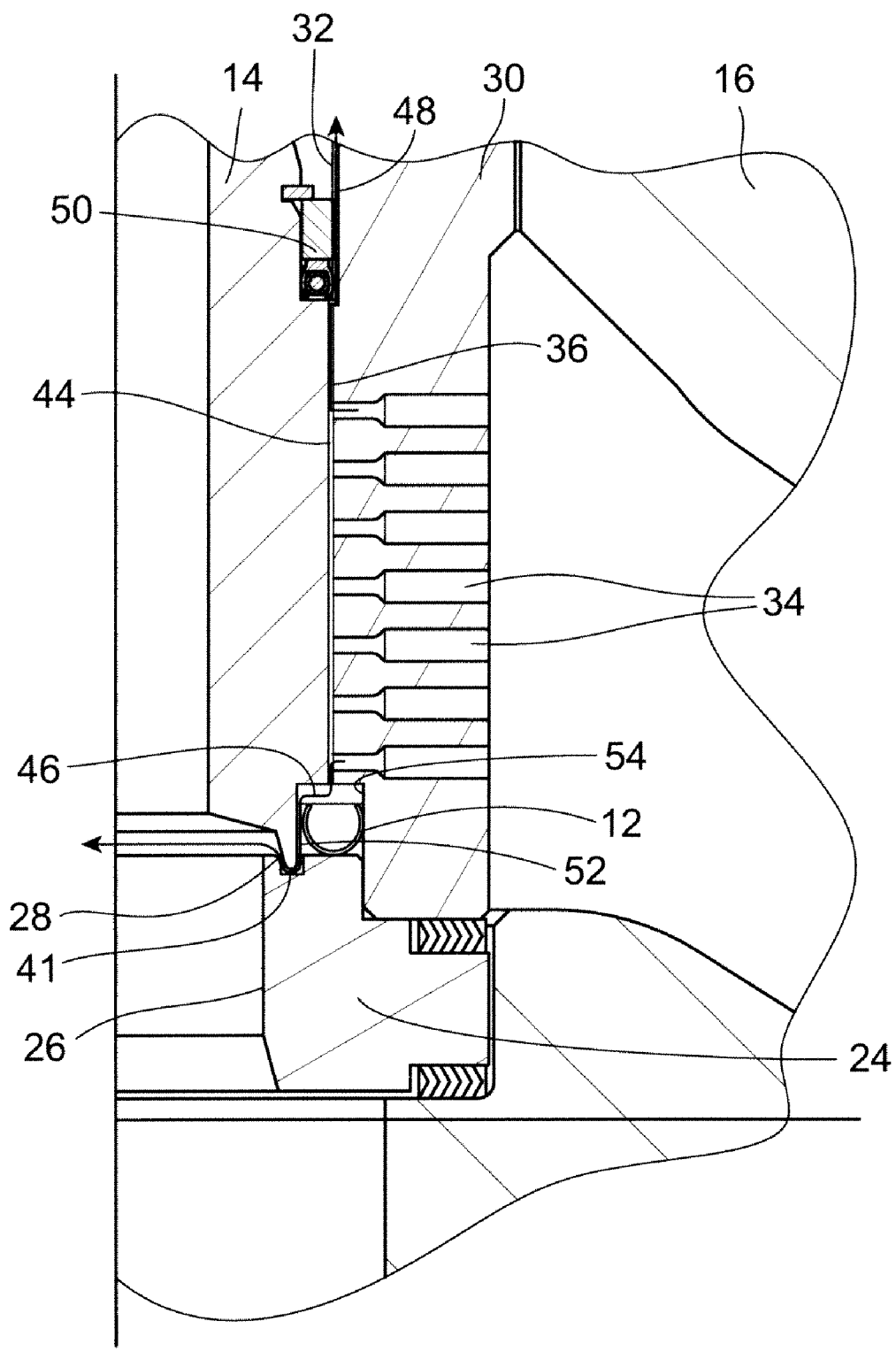
FIG. 2 is an enlarged view of a detail of FIG. 1 in cross-section.

FIGS. 1 and 2 illustrate a first embodiment of a fluid flow control device in the form of a control valve 10 with a seal 12 engaging an outer perimeter of a throttling element 14. The control valve 10 includes a valve body 16 defining an inlet 18, an outlet 20, and fluid flow path 22 extending from the inlet to the outlet. A valve seat ring 24 is coupled to the valve body 16 and defines an orifice 26 through which the fluid flow path passes. An upper portion of the valve seat ring 24 is formed with a contact surface 28.

A cage 30 is coupled to the valve body 16 and engages the valve seat ring 24. The cage 30 defines an interior bore 32 and at least one passage 34 extending through the cage 30 and through which the fluid flow path 22 passes.

The throttling element 14 has an outer surface 36 sized for slidable insertion into the cage interior bore 32. A stem 38 is coupled to the throttling element 14 and is further coupled to an actuator (not shown). The actuator reciprocates the stem 38 and attached throttling element 14 along an axis 40. The throttling element 14 is shown having a seating surface 41 oriented to engage the valve seat ring contact surface 28 when the throttling element 14 is in a closed position. The illustrated throttling element 14 further includes a balancing port 42 for equalizing the fluid pressures acting on opposite sides of the throttling element 14, as is generally known in the art.

To allow the throttling element 14 to freely move along the axis 40, a clearance gap 44 is provided between the throttling element outer surface 36 and the cage interior bore 32. The gap 44, which is exaggerated in FIG. 2 for clarity, extends around the throttling element 14 and therefore is annular in the exemplary embodiment. In a flow down application where fluid flows downwardly along the fluid flow path 22 as it passes through the valve seat ring orifice 26, as illustrated in FIGS. 1 and 2, the gap 44 creates two potential leak paths. A first or primary leak path 46 extends from the cage passages 34 and between the valve seat ring contact surface 28 and cage seating surface 41 to the valve seat ring orifice 26. A second or secondary leak path 48 extends from the cage passages 34 and between the cage 30 and throttling element 14 towards an upper portion of the throttling element. The throttling element 14 is shown having a secondary leak path seal assembly 50 which slidingly engages the cage interior bore 32 to prevent fluid flow through the secondary leak path 48.

The seal 12 is provided to reduce or prevent fluid flow through the primary leak path 46. The seal 12 is disposed in the primary leak path 46 and engages a sealing surface 52, separate from the seating surface 41, formed on an exterior perimeter of the throttling element 14. In the illustrated embodiment, the cage 30 and valve seat ring 24 define a recess 54 sized to receive the seal, thereby securing the seal 12 in place. The throttling element sealing surface 52 is separate from the seating surface 41 and extends substantially parallel to the axis 40. The sealing surface 52 may have an axial width which permits engagement of the seal 12 across a range of throttling element positions as it nears the fully closed position. While the seal 12 is illustrated having a c-shaped cross-section, it will be understood that other types of seals may be used. When provided with a C-shaped cross-section as illustrated, the seal 12 may be advantageously energized by fluid pressure present in the gap 44. The seal 52 may be formed of plated or unplated metal, plastic, or other seal materials.

In operation, the seal 12 engages the throttling element sealing surface 52 as the throttling element nears the fully closed position. The fluid attempting to travel along the primary leak path 46 is obstructed by the seal 52. Where the seal is formed of a flexible material, the fluid will engage and deform the seal 12 to increase its sealing pressure against the throttling element sealing surface 52, thereby further reducing fluid flow along the primary leak path 46. As a result, the seal 12 may provide a redundant seal in addition to engagement of the throttling element seating surface 41 and valve seat ring contact surface 28. Alternatively, the seal 52 may replace the engagement of the throttling element seating surface 41 and valve seat ring contact surface 28 as the primary seal. In either event, fluid flow along the primary leak path 46 is reduced or eliminated, thereby minimizing damage to the valve seat ring 24. Additionally, the control valve 10 is no longer reliant on force provided by the actuator to create a tight seal between the throttling element 14 and valve seat ring 24, thereby reducing performance requirements for the actuator.

Figure 3:
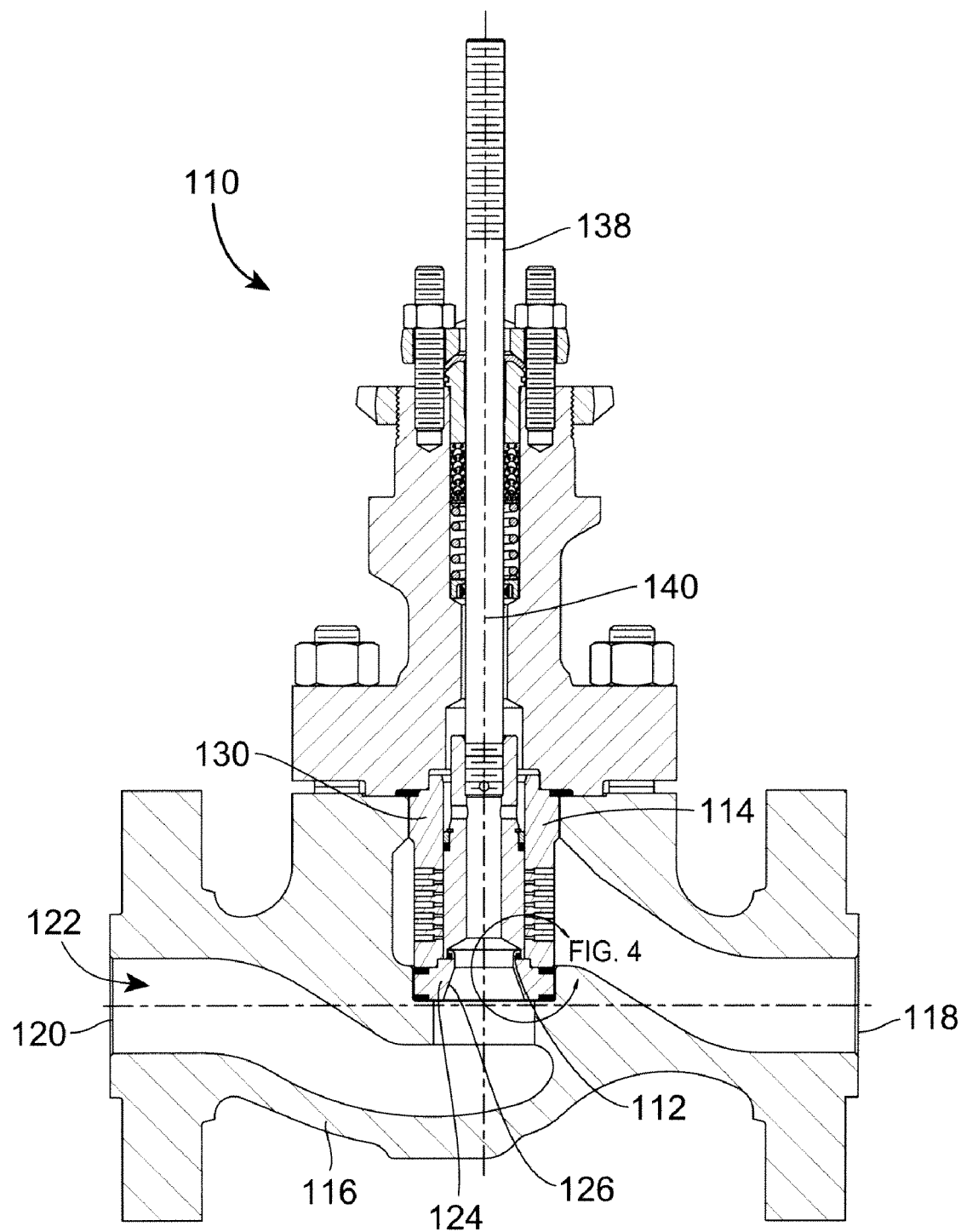
FIG. 3 is a side elevation view, in cross-section, of another embodiment of a fluid flow control device having a seal for restricting fluid flow through a primary leak path.
Figure 4:
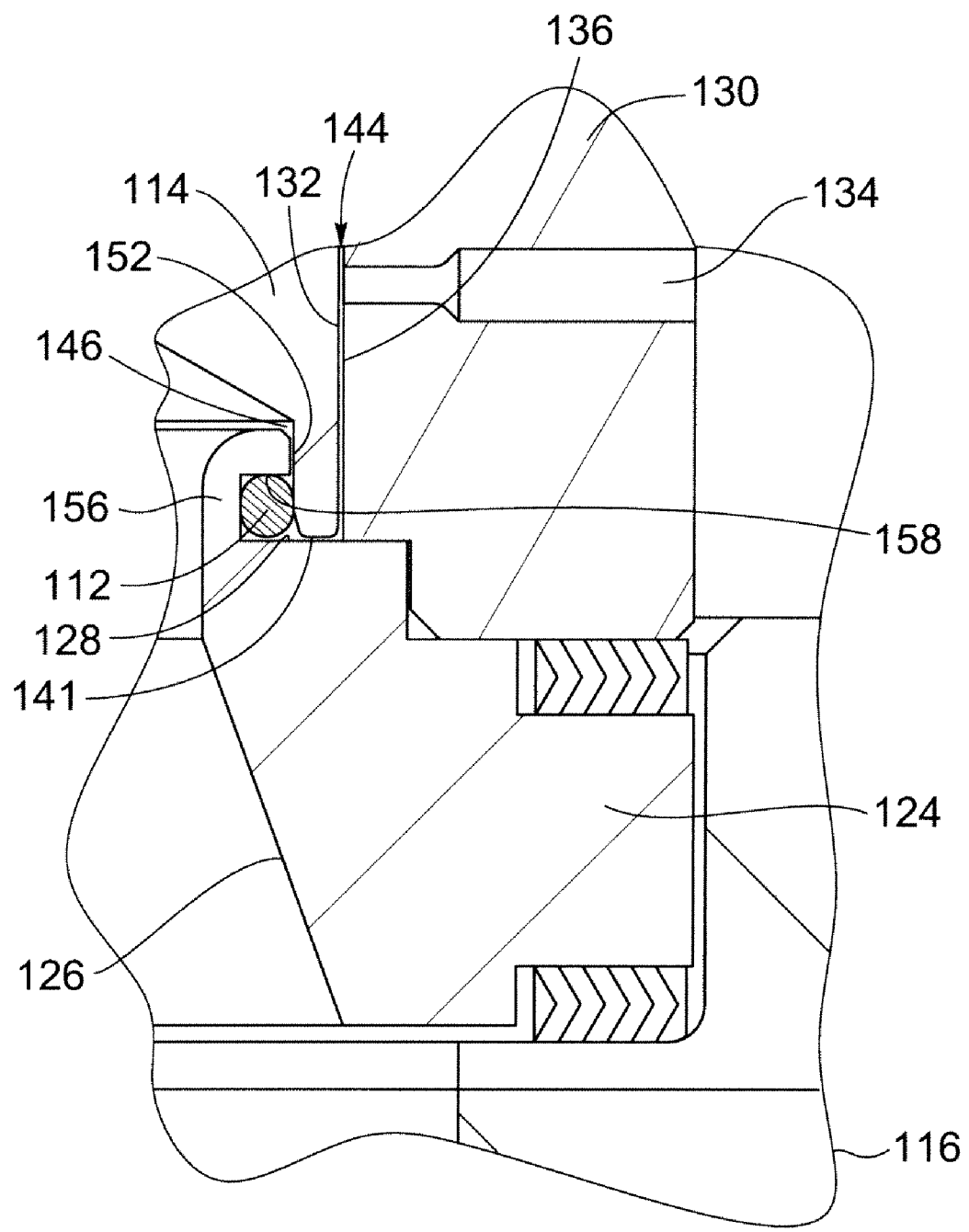
FIG. 4 is an enlarged view of a detail of FIG. 3.

FIGS. 3 and 4 illustrate an alternative exemplary embodiment of a control valve 110 having a seal 112 engaging a throttling element 114 to provide a primary seal for preventing fluid flow along a primary leak path 146. The control valve 110 includes a valve body 116 having an inlet 118, and outlet 120, and a fluid flow path 122 extending between the inlet and the outlet. A valve seat ring 124 is coupled to the valve body 116 and defines an orifice 126 through which the fluid flow path 122 passes. The valve seat ring 124 also defines a stop surface 128.

A cage 130 is coupled to the valve seat ring 124 and defines an interior bore 136. A plurality of passages 134 extends through the cage 130 through which the fluid flow path 122 passes.

The throttling element 114 includes an outer surface 132 sized for slidable insertion into the cage interior bore 136. A stem 138 is coupled to the throttling element 114 and is further coupled to an actuator (not shown) which reciprocates the stem 138 and the throttling element 114 along an axis 140 between open and closed positions. The throttling element 114 further includes a travel stop surface 141 positioned to engage the valve seat ring stop surface 128 thereby to limit travel of the throttling element 114.

Due to machine tolerances and considerations, a clearance gap 144 is formed between the valve cage interior bore 136 and the throttling element outer surface 132. The gap 144, which is exaggerated in FIG. 4 for clarity, defines a primary leak path 146 extending from the cage passages 134 and between the throttling element travel stop surface 141 and valve seat ring stop surface 128 to the valve seat ring orifice 126. Accordingly, when the throttling element 114 is in the fully closed position, fluid may travel from the inlet 118 through the cage passages 134, gap 144, and primary leak path 146 to the valve seat ring orifice 126.

The seal 112 is provided as a primary seal to reduce or prevent fluid flow along the primary leak path 146. In the illustrated embodiment, the valve seat ring 124 includes a gland section 156 which defines a channel recess 158 having an open end oriented outwardly away from the axis 140. The channel recess 158 is sized to receive the seal 112, thereby to retain the seal in place. The throttling element 114 includes a sealing surface 152 formed on an interior perimeter of the throttling element 114 and oriented substantially perpendicular to the axis 140. The seal 112 is sized and positioned to sealingly engage the throttling element sealing surface 152 as the throttling element 114 nears the travel stop defined by engagement of the stop surfaces 128, 141. The seal 112 is illustrated as an O-ring, however other types of seals made of plastic or formed metal may be used. As with the previous embodiment, the throttling element sealing surface 152 has an axial width, any point along which may sealingly engage with the seal 112.

In operation, the seal 112 advantageously minimizes fluid flow along the primary leak path 146 and susceptibility to erosion. As the throttling element 114 nears the fully closed position, the seal 112 engages the interior sealing surface 152 of the throttling element, thereby to reduce or prevent fluid flow along the primary leak path 146. Because the sealing surface 152 is located on an interior perimeter of the throttling element 114, it is not directly exposed to the fluid flow path 122 and therefore is less susceptible to damage from erosive elements entrained in the fluid. In addition, the seal 112 prevents fluid flow through the primary leak path 146, irrespective of the force supplied by the actuator to the throttling element 114. Still further, it will be appreciated that the throttling element travel stop surface 141 may erode without degrading performance of the seal 112, since the sealing surface 152 (and not the stop surface 141) forms part of the primary seal. In that regard, the travel stop surface 141 may be intentionally elongated to increase the life of the throttling element 114.

While the embodiments disclosed herein are described as having particular inlets and outlets defining a specific flow path, it will be appreciated that the inlet and outlet may be reversed without departing from the scope of this disclosure. In particular, rather than the "flow-down" styles illustrated herein, the fluid may flow upwardly through the valve seat ring orifice, past the plug, and through the cage to the outlet. The seals disclosed herein would provide the same benefits noted above in applications having this reverse flow direction.

The foregoing detailed description has been given for clearness of understanding only, and no unnecessary limitations should be understood therefrom, as modifications would be obvious to those skilled in the art.

The invention claimed is:

1. A fluid flow control device comprising:
 a body defining an inlet, an outlet, and a fluid flow path extending from the inlet to the outlet;
 a valve seat ring coupled to the body and defining an orifice through which the fluid flow path passes, the valve seat ring further defining an annular stop surface;
 a cage coupled to the body and defining an interior bore, the cage including at least one passage through which the fluid flow path passes;
 a throttling element sized for insertion into the cage interior bore and movable along an axis between open and closed positions, the throttling element defining a sealing surface oriented substantially parallel to the axis, a lower end of the throttling element defining an annular stop surface, wherein the sealing surface is located on an interior perimeter of the throttling element and wherein the annular stop surface of the lower end of the throttling element is adapted to engage the annular stop surface of the valve seat ring to limit travel of the throttling element;
 a primary leak path formed between the annular stop surface of the valve seat ring and the annular stop surface of the throttling element; and
 a seal disposed along the primary leak path and positioned to engage the sealing surface when the throttling element is substantially in the closed position, thereby to restrict fluid flow through the valve seat ring orifice.

2. The fluid flow control device of claim 1, in which the valve seat ring includes a gland section defining a channel oriented toward the throttling element interior perimeter and sized to receive the seal.

3. The fluid flow control device of claim 1, in which the seal comprises an O-ring.

4. The fluid flow control device of claim 1, in which the throttling element sealing surface has an axial width, and in which the seal engages the sealing surface at any point along the axial width of the sealing surface.

* * * * *